US007143937B2

(12) United States Patent
Rainey et al.

(10) Patent No.: US 7,143,937 B2
(45) Date of Patent: Dec. 5, 2006

(54) SYSTEMS AND METHODS FOR UTILIZING A TRACKING LABEL IN AN ITEM DELIVERY SYSTEM

(75) Inventors: Brent A. Rainey, Sterling, VA (US); Daryl S. Hamilton, Hyattsville, MD (US); Anthony M. Ferlaino, Fairfax, VA (US)

(73) Assignee: United States Postal Service, Washington, DC (US)

( * ) Notice: Subject to any disclaimer, the term of this patent is extended or adjusted under 35 U.S.C. 154(b) by 113 days.

(21) Appl. No.: 10/468,482

(22) PCT Filed: Feb. 21, 2002

(86) PCT No.: PCT/US02/03395

§ 371 (c)(1),
(2), (4) Date: Aug. 21, 2003

(87) PCT Pub. No.: WO02/069224

PCT Pub. Date: Sep. 6, 2002

(65) Prior Publication Data

US 2004/0074965 A1 Apr. 22, 2004

Related U.S. Application Data

(60) Provisional application No. 60/269,971, filed on Feb. 21, 2001.

(51) Int. Cl.
*G06K 15/00* (2006.01)

(52) U.S. Cl. ...................... 235/383; 235/375; 235/470; 235/462.13; 705/406

(58) Field of Classification Search ................ 235/385, 235/375, 383, 454, 462.01, 462.13, 470; 902/37, 41; 705/1, 28, 406
See application file for complete search history.

(56) References Cited

U.S. PATENT DOCUMENTS 3,409,129 A * 11/1968 Sperry ........................ 209/3.3

(Continued)

FOREIGN PATENT DOCUMENTS

JP 5-40841 2/1993

OTHER PUBLICATIONS

Brent A. Rainey et al., "Systems and methods for producing and managing a tracking label in an item delivery system," U.S. Appl. No. 10/468,296, filed Aug. 20, 2003.

(Continued)

*Primary Examiner*—Jared J. Fureman
(74) *Attorney, Agent, or Firm*—Finnegan, Henderson, Farabow, Garrett & Dunner, LLP

(57) ABSTRACT

Collecting a label in an item delivery system (100) comprises reading a label on a unit load when the unit load is terminated, defacing the label if the quality of the label meets a predefined quality level, depositing the label in a read bin holder if the quality of the label meets a predetermined quality level, and depositing the label in a no-read bin holder if the quality of the label does not meet a predefined quality level. The item delivery system includes a network (160) facilitating communication between an information system (110), a label collection system (120), legacy systems (130), customer systems (140), and delivery systems (150).

18 Claims, 7 Drawing Sheets

U.S. PATENT DOCUMENTS

| | | | | |
|---|---|---|---|---|
| 5,138,140 | A | 8/1992 | Siemiatkowski et al. | 235/462 |
| 5,177,368 | A | 1/1993 | Kay | |
| 5,208,762 | A | 5/1993 | Charhut et al. | |
| 5,216,620 | A | 6/1993 | Sansone | 364/478 |
| 5,292,008 | A | 3/1994 | Sansone et al. | 209/584 |
| 5,325,303 | A | 6/1994 | Walz et al. | 364/464.02 |
| 5,388,049 | A | 2/1995 | Sansone et al. | |
| 5,421,778 | A | 6/1995 | Kouramanis | 462/2 |
| 5,470,427 | A | 11/1995 | Mikel et al. | 156/387 |
| 5,478,184 | A * | 12/1995 | Bryant et al. | 414/416.05 |
| 5,612,889 | A | 3/1997 | Pintsov et al. | 364/478.14 |
| 5,697,648 | A | 12/1997 | Petkovsek | 283/61 |
| 5,951,053 | A | 9/1999 | Petkovsek | 283/81 |
| 6,011,758 | A | 1/2000 | Dockes et al. | 369/30 |
| 6,035,291 | A | 3/2000 | Thiel | |
| 6,035,391 | A | 3/2000 | Isaman | 712/222 |
| 6,089,613 | A | 7/2000 | Petkovsek | 283/79 |
| 6,134,561 | A | 10/2000 | Brandien et al. | 707/104 |
| 6,154,733 | A | 11/2000 | Pierce et al. | 705/408 |
| 6,201,203 | B1 * | 3/2001 | Tilles | 209/584 |
| 6,321,992 | B1 | 11/2001 | Knowles et al. | 235/478.01 |
| 6,338,434 | B1 | 1/2002 | Wilz, Sr. et al. | 235/462.01 |
| 6,839,138 | B1 * | 1/2005 | Welchman et al. | 356/394 |
| 6,953,906 | B1 * | 10/2005 | Burns et al. | 209/584 |
| 2002/0065717 | A1 | 5/2002 | Miller et al. | |
| 2004/0074977 | A1 | 4/2004 | Rainey et al. | |
| 2004/0083228 | A1 | 4/2004 | Rainey et al. | |
| 2005/0075997 | A1 | 4/2005 | Raney et al. | |

OTHER PUBLICATIONS

United States Postal Service Special Services, "Technical Guide: Postal Forms and Labels (Domestic Service Only)," Publication 109, Updated Notice, Mar. 23, 2001.

International Search Report dated Jun. 7, 2002 for application PCT/US02/03395.

International Search Report dated Jun. 12, 2002 for application PCT/US02/03396.

International Search Report dated May. 22, 2002 for application PCT/US02/03393.

International Search Report dated Aug. 7, 2002 for application PCT/US02/03394.

Japio abstract of JP 5-40845, Feb. 1993.

United States Postal Service, "Special Services Technical Guide: Postal Forms and Labels (Domestic Service Only)", Publication 109, Mar. 2000, updated with Postal Bulletin Revisions through Dec. 8, 2005 (36 pages).

* cited by examiner

SYSTEMS AND METHODS FOR UTILIZING A TRACKING LABEL IN AN ITEM DELIVERY SYSTEM

RELATED APPLICATIONS

Under provisions of 35 U.S.C. § 119(e), Applicants claim the benefit of U.S. Provisional Application No. 60/269,971, filed Feb. 21, 2001, which is incorporated herein by reference. PCT patent applications Ser. Nos. PCT/US02/03396, PCT/US02/03394 and PCT/US02/03393, filed on even date herewith, each in the name of Brent A. Rainey, et al. and entitled "IMPROVED TRACKING LABEL," "SYSTEMS AND, METHODS FOR PROCESSING ITEMS IN AN ITEM DELIVERY SYSTEM," and "SYSTEMS AND METHODS FOR PRODUCING AND MANAGING A TRACKING LABEL IN A AN ITEM DELIVERY SYSTEM," respectively, and each assigned to the assignee of the present application, are hereby incorporated by reference.

DESCRIPTION

1. Field

The invention relates generally to systems and methods for processing items in an item delivery system, and more particularly, to systems and methods for utilizing a tracking label in an item delivery system.

2. Background

The United States Postal Service (USPS) is an independent government agency that provides mail delivery and other services to the public. The USPS is widely recognized as a safe and reliable means for sending and receiving mail and other items. With the advent and steady growth of electronic mail and electronic commerce, the physical mail stream will increasingly be utilized for sending and receiving packages and other items. In an effort to lower operating costs and increase value for their customer base, many high volume delivery users prepare packages and other items with automated equipment and presort and label the items prior to placement of the items into an item delivery system. These customers, along with other senders, wish to track items as they pass through various points in the item delivery system.

Therefore, the need to efficiently process items in an item delivery system has become a common need for many item delivery system operators. More specifically, utilizing a tracking label in an item delivery system has become a critical need for many item delivery system operators. This is because in an increasingly competitive environment, meeting and exceeding the expectations of customers, senders, or others who receive services is essential for item delivery system operators.

Conventional systems and methods often do not allow for producing and managing a tracking label in an item delivery system. Rather, conventional systems merely provide routing information. For example, conventional systems provide information that allows items to be sent from point A to point B, and do not track where the item came from, who prepared the item, when the item was prepared, or where the item is in the item delivery system.

With prior art systems and methods, for example, there can be hundreds of tracking indicia that are identical for different items going to the same place. When problems are detected in conventional systems, for example, an incorrect label or an incorrect method of preparing the item, there is no way to track exactly when, where, or how the problem was created. Therefore, no means exists to identify and correct the problem.

Thus, there remains a need for efficiently processing items in an item delivery system. In addition, there remains a need for systems and methods for utilizing a tracking label in an item delivery system.

SUMMARY OF THE INVENTION

Consistent with the present invention, systems and methods for utilizing a tracking label in an item delivery system are provided that avoid problems associated with prior art systems and methods for utilizing a tracking label in an item delivery system as discussed herein above.

In one aspect, a method for collecting a label in an item delivery system comprises reading a label on a unit load when the unit load is terminated, defacing the label if the quality of the label meets a predefined quality level, depositing the label in a read bin holder if the quality of the label meets a predefined quality level, and depositing the label in a no-read bin holder if the quality of the label does not meet a predefined quality level.

In another aspect, a system for collecting a label in an item delivery system comprises a component for reading a label on a unit load when the unit load is terminated, a component for defacing the label if the quality of the label meets a predefined quality level, a component for depositing the label in a read bin holder if the quality of the label meets a predefined quality level, and a component for depositing the label in a no-read bin holder if the quality of the label does not meet a predefined quality level.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DESCRIPTION OF THE EMBODIMENTS

Figure 1:
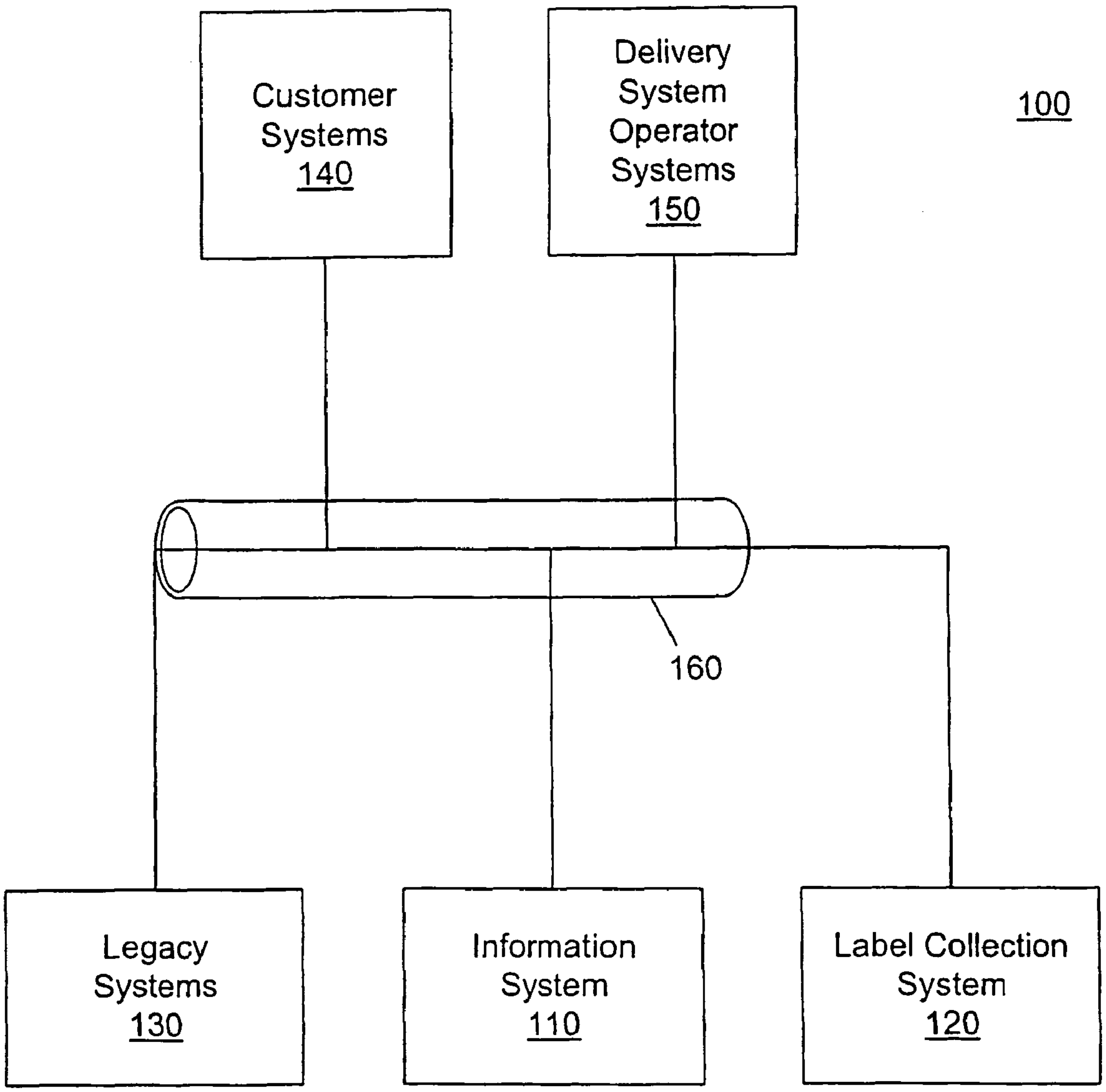
FIG. 1 is a functional block diagram of an exemplary system for providing an information system in an item delivery system consistent with an embodiment of the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Consistent with an embodiment of the present invention, a system for collecting a label in an item delivery system comprises a component for reading a label on a unit load when the unit load is terminated, a component for defacing the label if the quality of the label meets a predefined quality level, a component for depositing the label in a read bin holder if the quality of the label meets a predefined quality level, and a component for depositing the label in a no-read bin holder if the quality of the label does not meet a predefined quality level.

As herein embodied and illustrated in FIG. 1, an item delivery system 100 may comprise an information system 110, a label collection system 120, legacy systems 130, customer systems 140, and delivery system operator systems 150. In addition, system 100 may include a network 160 to facilitate communications between each of the aforementioned systems. Each of the elements comprising system 100, and the interrelationships between the aforementioned network 160 and the aforementioned systems will be described in greater detail below.

A component for reading a tracking indicia on a unit load may comprise any device within system 100 capable of reading data from a label and making this data available to network 160. Specifically, the component for reading a tracking indicia may comprise at least one system within legacy systems 130 or it may comprise elements of label collection system 120. A component for updating a database with first data from the tracking indicia and a component for updating the database with information that the unit load has been terminated may comprise elements of information system 110. Those skilled in the art will appreciate that other systems, servers, devices, or components of system 100 may comprise the aforementioned component for reading, component for updating a database with first data from the tracking indicia, and component for updating the database with information that the unit load has been terminated.

Figure 6:
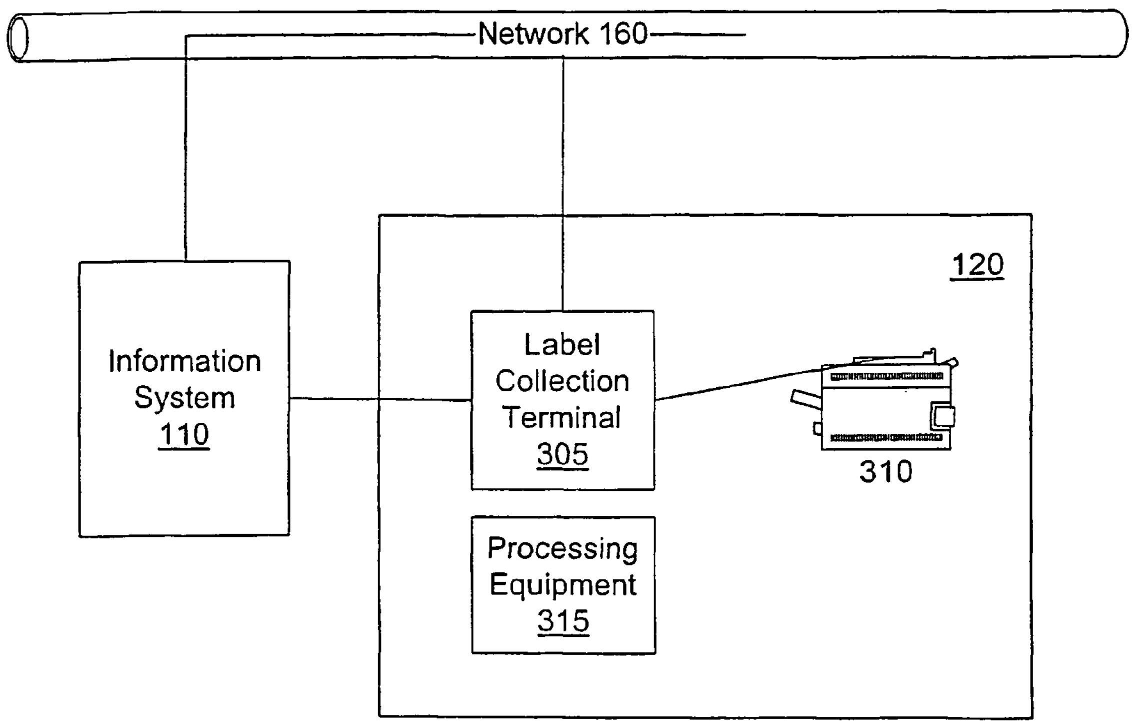
FIG. 6 is a functional block diagram of an exemplary label collection system consistent with an embodiment of the present invention.

In addition, as herein embodied and illustrated in FIG. 6, a system for collecting a label in an item delivery system may comprise a label collection system 120. Specifically, a component for reading a label, a component for defacing the label, a component for depositing the label in a read bin holder, and a component for depositing the label in a no-read bin holder may all be embodied by a label collection terminal 305.

Generally, items used in conjunction with exemplary embodiments of the present invention may comprise a mailpiece, a United States Postal Service Priority Mail package, United States Postal Service Express Mail package, or other items as are know by those of ordinary skill in the art. Moreover, a unit load may comprise a plurality of items passing through portions of system 100 gathered into containers, such as, trays, sacks, or tubs as are know by those of ordinary skill in the art.

Labels processed by label collection terminal 305 may comprise a bar code or a PLANET code. A bar code is a printed code used for recognition by a bar code scanner (reader). Traditional one-dimensional bar codes use the bar's width to encode a product or account number. Two-dimensional bar codes, such as PDF417, MAXICODE and DATAMATRIX, are scanned horizontally and vertically and hold considerably more data. Generally, PDF417 is widely used for general purposes, MAXICODE is used for high-speed sorting, and DATAMATRIX is used for marking small parts.

Historically, system operators sorted flat mail using POSTNET, a 12-digit barcode consisting of alternating long and short bars indicating the destination of, for example, a mailpiece. Responding to the expanding needs of users, particularly heavy volume users, PLANET code was developed on the foundation of the existing technical infrastructure. The PLANET Code is the opposite of the current POSTNET codes, reversing long bars for short and short bars for long. This innovation offers the convenience of a bar code that is easily applied using current bar-coding methods, and is readily scanned by the high-speed automation equipment already located in the plurality of plants within system 100.

In addition, related POT Patent Application Ser. No. PCT/US02/03396, entitled "IMPROVED TRACKING LABEL" which has previously been incorporated by reference, describes an exemplary improved tracking label that may be used in conjunction with embodiments of the present invention. Those of ordinary skill in the art, however, will appreciate that other types of labels and racking indicia may be used.

As shown in FIG. 1, information system 110 and label collection system 120 are connected to network 160 and will be described in greater detail below with respect to FIG. 2 and FIG. 6 respectively below. Legacy system 130 may comprise sorting and processing equipment used to delivery items in an item delivery system. This sorting and processing equipment may be located in plants located in the item delivery system and may be capable of reading data from a label placed on items and making this data available to network 160. Generally, in delivering an item to a recipient, the item is sent through a delivery path, which comprises a plurality of plants. The plants within the delivery path contain, among other things, servers, automated systems, and sorting equipment that are designed to receive and process a plurality of items. The automated servers, systems, and sorting equipment comprising the delivery path may be configured to sense tracking indicia or labels placed on items or containers of items as they passes through the elements of the delivery path directing the movement of the items or the containers of items. The movement of the items or the containers of items are directed through the delivery path until they efficiently converge on the location most favorable for the delivery of the items to the recipient of the item. Specifically, items may go through a series of handling operations that will allow the item to be sorted to a level where it can be delivered to the next processing plant or facility that would allow the item to be delivered to the recipient.

Customer systems 140 may comprise systems, servers, or components not owned by the item delivery system operator, but are operated by customers or others who receive service from or who offer service to the item delivery system operator. For example, customer systems 140 may obtain access to network 160 through the Internet in ways that are known by those of ordinary skill in the art. Operators of customer systems 140 may wish, for example, to check on the status of an item tendered to the item delivery system. Those of ordinary skill in the art will appreciate that there are many other operations that may be performed by customer systems 140 under the control of customers or others who receive service from or who offer service to the item delivery system operator.

Delivery system operator systems 150 may comprise systems, servers, or components operated by the item delivery system operator. Related POT Patent Application Ser. No. PCT/US02/03394, entitled "SYSTEMS AND METHODS FOR PROCESSING ITEMS IN AN ITEM DELIVERY SYSTEM" which has previously been incorporated by reference, describes exemplary delivery system operator systems that may be used in conjunction with embodiments of the present invention.

Figure 2:
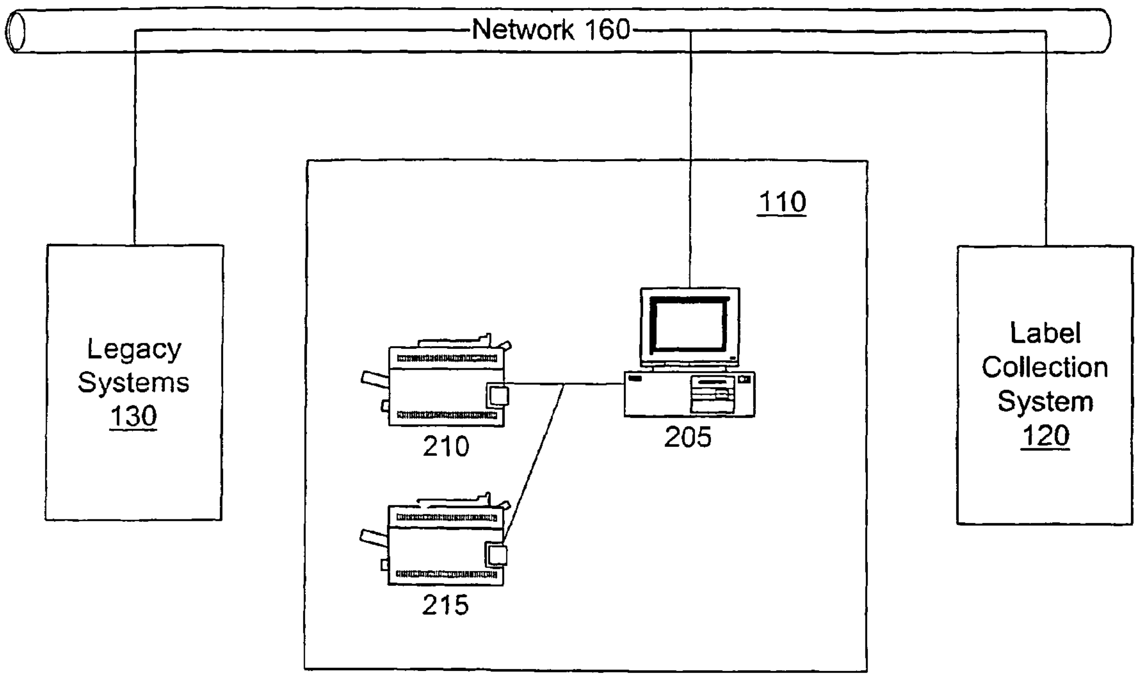
FIG. 2 is a functional block diagram of an exemplary information system consistent with an embodiment of the present invention.

As shown in FIG. 2, information system 110 may comprise an information server 205, a first printer 210, and a second printer 215. Information system 110 may be used to collect and maintain data on the status of reading labels, or labels that are being read by label collection system 120 or legacy systems 130, for example. Information system 110 may provide two functions. First, it may collect and manage data from associated transactions corresponding to processing or consuming unit loads, and second, it may control the production of labels. Unit loads may comprise, for example, trays, sacks, or tubs of mailpieces or other items.

Information system 110, in terms of the functionality, may provide external customer (through customer systems 140) or operators within the items delivery system (through delivery system operator systems 150) with the means of communicating label request information in terms of bulk production data to a central label production center. For example, label production requests may be received by information server 205 and printed on printer 210, which may be located at a central bulk printing facility. In addition, labels may be printed on printer 215 that may be locally located in close proximity to, for example, processing equipment in the item delivery system. Related POT Patent Application Ser. No. PCT/US02/3396, entitled "IMPROVED TRACKING LABEL" which has previously been incorporated by reference, describes an exemplary improved tracking label that may be used in conjunction with embodiments of the present invention including information system 110. Those of ordinary skill in the art, however, will appreciate that other types of labels and tracking indicia may be used by information system 110.

In addition, information system 110 may collect label data into a database located on information server 205. The label data may reflect event transaction information associated with the reading of the label including, for example, the date and time the label was printed, an operation ID, operation associated with that particular transaction, a machine ID, the weight of that particular mail piece, the quantity of items associated with that particular event. The event transaction information, where applicable, may also record other information such as the location of the operation or the operator who is inducting the particular tray label or the unit load that the tray level is associated with.

Information system 110 may provide functionalities to account for the determination, such as consumption, of trays and sacks. A tray or sack of items (mail pieces, for example), is considered "consumed" or "terminated" when it's contents are removed for further processing within an item delivery system processing facility. Specifically, as unit loads are consumed, data corresponding to the consumption may be recorded in the database on information server 205. In addition, information system 110 may also allow for the dissemination of the aforementioned data from the database by the integration with other systems, such as customer systems 140 and delivery system operator systems 150, through network 160.

As shown in FIG. 1, network 160 may comprise, for example, a local area network (LAN) or a wide area network (WAN). Such networking environments are commonplace in offices, enterprise-wide computer networks, intranets, and the Internet, and are known by those skilled in the art. When a LAN is used as network 160, the various servers, systems, components, and devices may be connected to network 160 through a network interface located at each of the respective servers, systems, components, and devices. When a WAN networking environment is utilized as network 160, the various servers, systems, components, and devices each typically include an internal or external modem (not shown) or other means for establishing communications over the WAN, such as the Internet.

Network 160 may utilizes wire line or wireless telecommunications technologies when connecting to, for example, the various servers, systems, components, and devices of system 100. Wireless telecommunications may include radio transmission via the airwaves; however, those of ordinary skill in the art will appreciate that various other telecommunication techniques can be used to provide wireless transmission, including infrared line of sight, cellular, microwave, satellite, blue-tooth packet radio, and spread spectrum radio. Wireless data may include, but is not limited to, paging, text messaging, e-mail, Internet access, instant messaging, and other specialized data applications specifically excluding or including voice transmission.

Servers, terminal, systems, and devices utilized in system 100 may comprise mobile phones, personal computers, hand-held computing devices, multiprocessor systems, microprocessor-based or programmable consumer electronic devices, minicomputers, mainframe computers, personal digital assistants (PDA), facsimile machines, telephones, pagers, portable computers, or any other devices for, analyzing, receiving, and/or transmitting information. Servers, systems, and devices utilized in system 100 may utilize cellular telephone protocols such as wireless application protocol (WAP), or blue-tooth protocol. The invention, as disclosed in this embodiment, in its broadest sense is not limited to a particular form of system or communications protocol. And those of ordinary skill in the art will recognize that other systems and components may be utilized within the scope and spirit of the invention.

Figure 3:
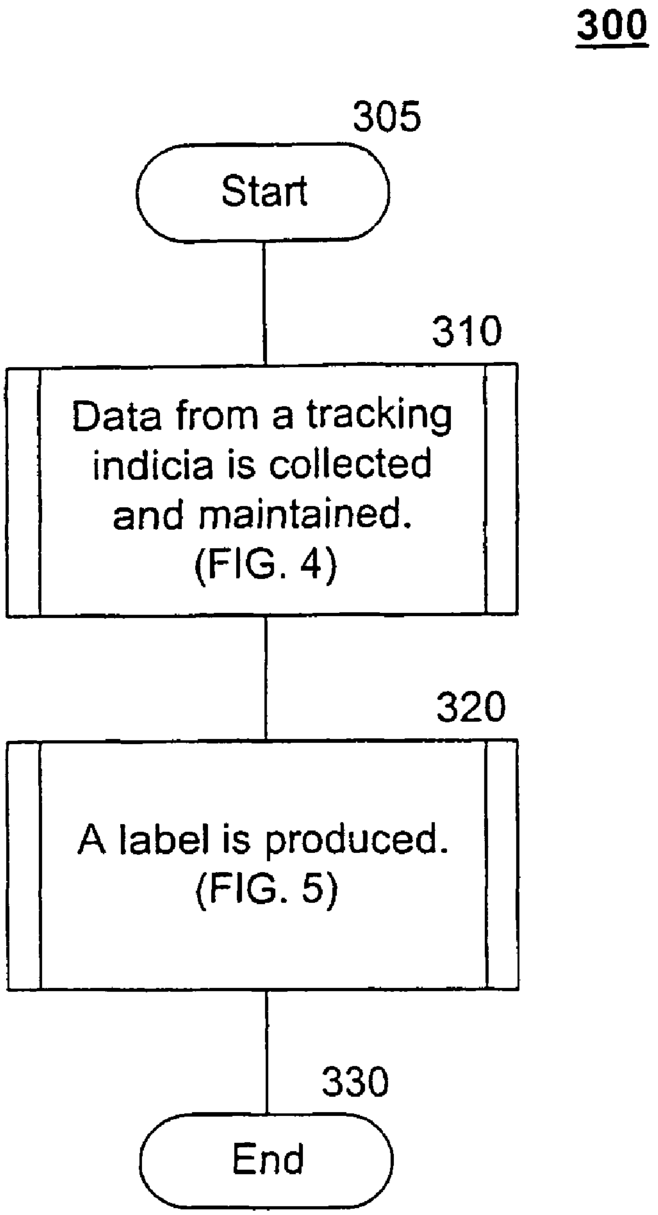
FIG. 3 is a flow chart of an exemplary method for providing an information system in an item delivery system consistent with an embodiment of the present invention.

FIG. 3 is a flow chart setting forth the general stages involved in an exemplary method 300 for providing an information system in an item delivery system. The implementation of the stages of exemplary method 300 in accordance with an exemplary embodiment of the present invention will be described in greater detail in FIG. 4 through FIG. 5.

Figure 4:
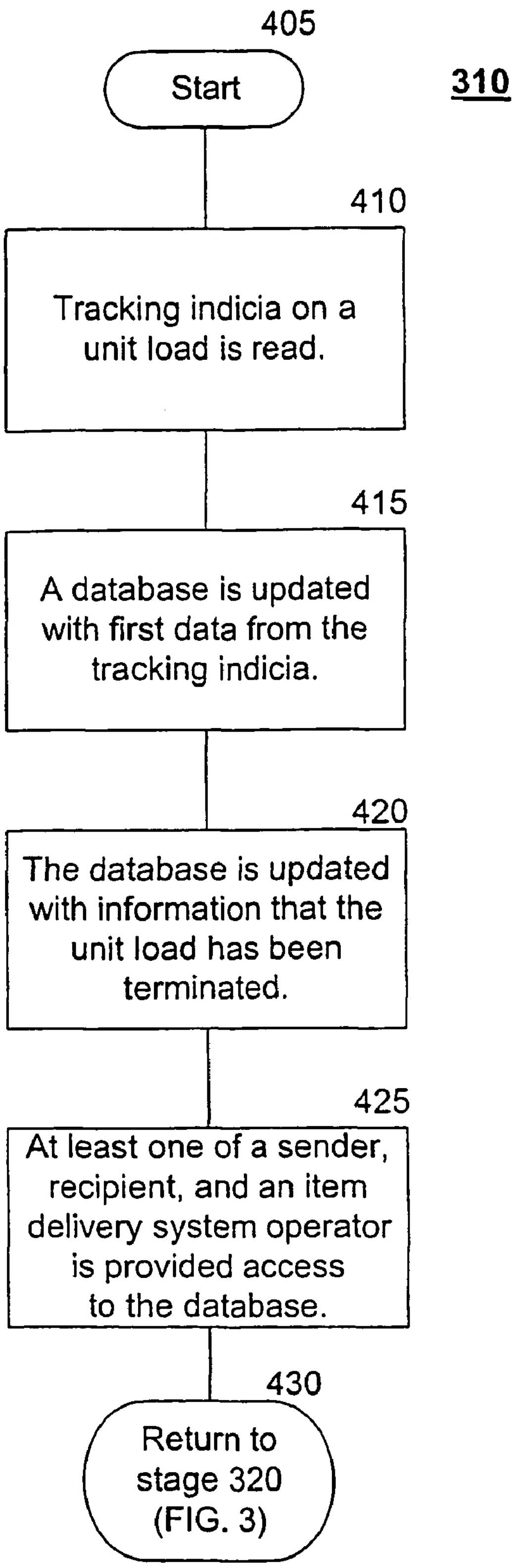
FIG. 4 is a flow chart of a subroutine used in the method of FIG. 3 for collecting and maintaining data from a tracking indicia consistent with an embodiment of the present invention.
Figure 5:
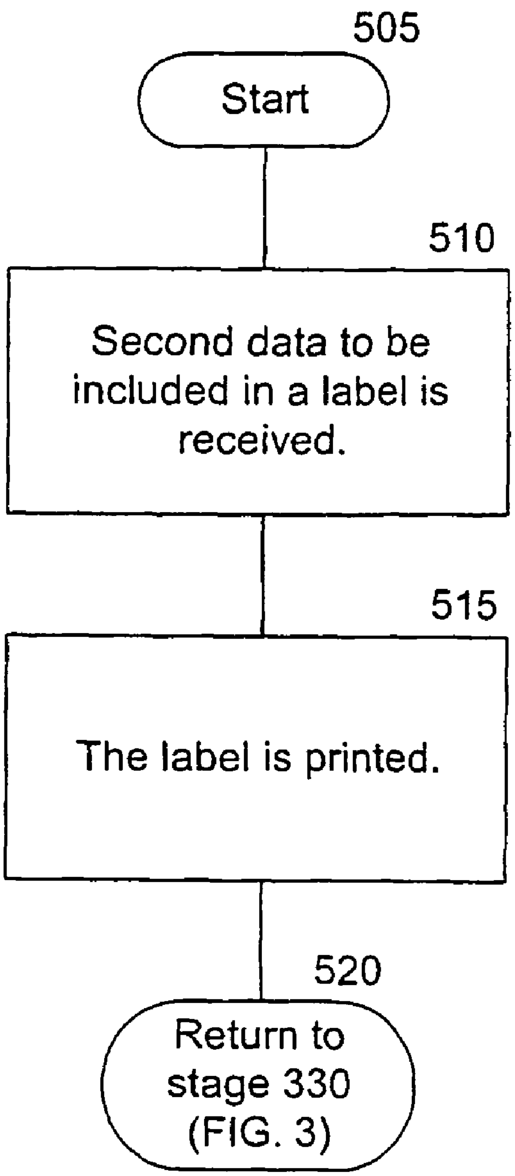
FIG. 5 is a flow chart of a subroutine used in the method of FIG. 3 for producing a label consistent with an embodiment of the present invention.

Exemplary method 300 begins at starting block 305 and proceeds to exemplary subroutine 310 where data from the tracking indicia is collected and maintained. The stages of exemplary subroutine 310 are shown in FIG. 4 and will be described in greater detail below. From exemplary subroutine 310, exemplary method 300 continues to exemplary subroutine 320 where the label is produced. The stages of exemplary subroutine 320 are shown in FIG. 5 and will be described in greater detail below. From exemplary subroutine 320, exemplary method 300 ends at stage 330.

FIG. 4 is a flow chart describing exemplary subroutine 310 from FIG. 3, in which data from the tracking indicia is collected and maintained. Exemplary subroutine 310 begins at starting block 405 and advances to stage 410 where the tracking indicia on the unit load is read. For example, labels associated with unit loads or other items may be scanned by devices comprising legacy systems 130 or label collection system 120. First data from the label may be read and made available, for example, to information server 205 over network 160.

After the tracking indicia on the unit load is read in stage 410, exemplary subroutine 310 advances to stage 415 where the database is updated with the first data from the tracking indicia. For example, a database may be located on information server 205. A software module on information server 205 may receive first data and save it to the database located, for example, on storage media located on information server 205.

Once the database is updated with the first data from the tracking indicia in stage 415, exemplary subroutine 310 continues to stage 420 where the database is updated with information that the unit load has been terminated. For example, the unit load may be subject to processing that would consume or otherwise terminate the unit load by a particular processing unit. In this case, a device associated with the particular processing unit may make available to information server 205 information corresponding to this consumption. Furthermore, the information corresponding to this consumption may include at least one of a date and a time the tracking indicia is read, an ID of an operation associated with the reading of the tracking indicia, a weight of the unit load, a quantity of items associated with the unit load, a location of where the tracking indicia is read, an ID of an operator operating a device reading the tracking indicia, and an ID of a machine reading the tracking indicia.

From stage 420 where the database is updated with information that the unit load has been terminated, exemplary subroutine 310 continues to stage 425 where at least one of the sender, the recipient, and the item delivery system operator is provided access to the database. For example, operators of customer systems 140 or delivery system operator systems 150 may access the database in the information system 110 through network 160.

After at least one of the sender, the recipient, and the item delivery system operator is provided access to the database in stage 425, exemplary subroutine 310 advances to stage 430 and returns to stage 320 of FIG. 3.

FIG. 5 is a flow chart describing exemplary subroutine 320 from FIG. 3 in which the label is produced. Exemplary subroutine 320 begins at starting block 505 and advances to stage 510 where the second data to be included in the label is received. For example, information system 110, in terms of the functionality, may provide external customers (through customer systems 140) or operators within the items delivery system (through delivery system operator systems 150) with the means of communicating label request information in terms of bulk production data to a central label production center. Second data may comprise data corresponding to a request for bulk label printing service.

After the second data to be included in the label is received in stage 510, exemplary subroutine 320 advances to stage 515 where the label is printed. For example, label production requests may be received and printed on printer 210 which may be a central bulk printing facility. In addition, labels may be printed on printer 215 which may be locally located in close proximity to, for example, processing equipment in the item delivery system.

Once the label is printed in stage 515, exemplary subroutine 320 continues to stage 520 and returns to stage 330 of FIG. 3.

As shown in FIG. 6, label collection system 120 may comprise a label collection terminal 305, a printer 310, and processing equipment 315. Label collection terminal 305 may comprise a microprocessor-based tray or sack label scanning device that will allow, for example, bar-coded label data to be captured at the point of consumption. A tray or sack of items, mail pieces for example, is considered consumed or terminated when its contents are removed for further processing within an item delivery system processing facility. The fact that a particular load unit, comprising a tray or sack for example, has been consumed may be communicated to information system 110. Label collection terminal 305 may identify a particular load unit by a unique ID on a label placed on the load unit.

Label collection terminal 305 may be installed, for example, at an induction station of processing equipment in a processing facility that receives and processes trays of mail or other items, for example. Printer 310 may be included in label collection system 120 for local printing.

Label collection terminal 305 may be free standing, mounted next to processing equipment 315, and may operate as a receptacle for barcoded tray or sack labels. Tray or sack labels may be inserted through a pressure-sensitive pinch-feed roller mechanism located on label collection terminal 305. The powered pinch roller mechanism may automatically detect, consume, and scan a label regardless of label orientation (barcode side up or down). Label collection terminal 305 may utilize off-the-shelf readily available barcode scanner technology to decode and parse barcodes such as, for example, the 10-digit Interleaved 2 of 5 and the 24-digit USS code 128 barcodes. The barcode scanners may be mounted above and below a label insertion port. Upon scanning the label, the label may be defaced and deposited in a label collection container comprising a read bin holder attached to label collection terminal 305. In addition a no-read bin may be included for labels not meeting quality standards for accurate reading. Furthermore, label collection terminal 305 may have the capability to stop processing equipment 315 from processing if label collection terminal 305 detects that, for example, a tray or sack is at the wrong processing equipment.

Figure 7:
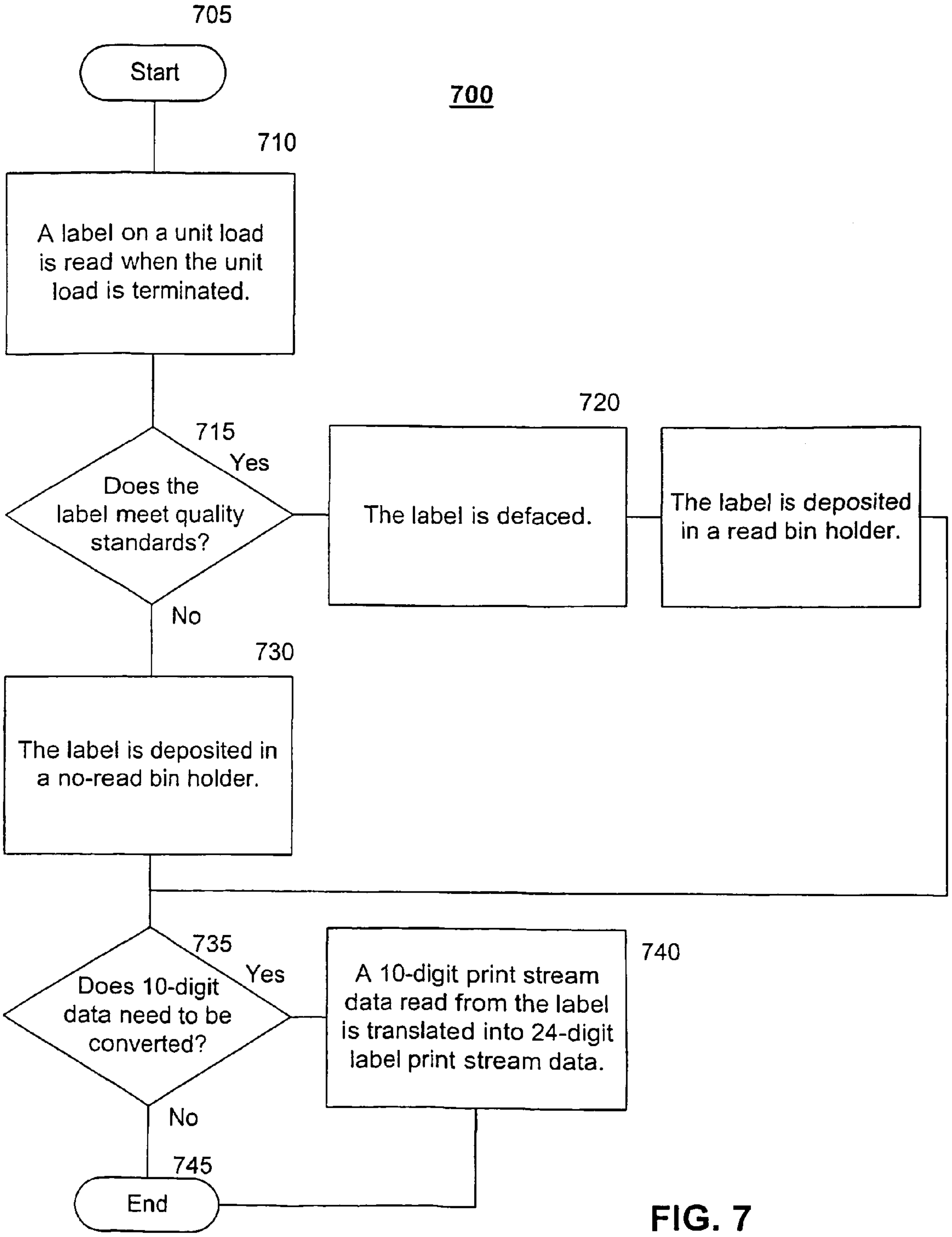
FIG. 7 is a flow chart of an exemplary method for collecting a label in an item delivery system consistent with an embodiment of the present invention.

FIG. 7 describes exemplary method 700 for collecting a label in an item delivery system consistent with an embodiment of the present invention. Exemplary method 700 begins at starting block 705 and advances to stage 710 where the label on a unit load is read when the unit load is terminated. For example, a label for the unit load being processed may be inserted through a pressure-sensitive pinch-feed roller mechanism located on label collection terminal 305. The powered pinch roller mechanism may automatically detect, consume, and scan a label regardless of label orientation (barcode side up or down). In addition, the label may contain a code unique to the unit load being processed.

From exemplary stage 710, exemplary method 700 advances to decision block 715 where it is determined if the label meets quality standards. For example, if label collection terminal 305 is unable to read an indicia on the label, or if it is able to only obtain partial data, this may be considered to be poor quality. Quality standards for bar codes, for example, may be obtained form the American National Standards Institute (ANSI) of 1819 L Street, NW, 6th Fl., Washington, D.C., 20036.

If it is determined at decision block 715 that the label meets quality standards, exemplary method 700 advances to stage 720 where the label is defaced. Defacing is performed to prevent a label from being read multiple times, a situation which may cause database error or other forms of confusion. One example of defacing may be a mechanism in label collection terminal 305 placing a red mark on the face of the label, thus signifying the label has been successfully read. Those of ordinary skill in the art will appreciate that there are other ways to deface the label.

After the label is defaced in stage 720, exemplary method 700 continues to stage 725 where the label is deposited in the read bin holder (not shown). The read bin holder may comprise a box, holder, can, reservoir, or other device capable of storing labels after they have been read.

If it is determined at decision block 715 that the label does not meet quality standards, exemplary method 700 advances to stage 730 where the label is deposited in a no-read bin holder. The labels not meeting quality standards may be reprocessed latter to determine, for example, the source of the reading error. Data on the face of the label may indicate where or on what machine the label was prepared, for example. Given this information, feedback can be provided in order to facilitate the correction of the problem causing the unsatisfactory quality of the label.

From stage 725 where the label is deposited in the read bin holder, or from stage 730 where the label is deposited in the no-read bin holder, exemplary method 700 advances to decision block 735 where it is determined if label data needs to be converted. For example, the label may contain data from a code that is not the current standard, such as a 10-digit bar code data. In addition, further processing may be required by processing equipment 315 requiring the printing of a new label based on data from the label. In this case, label collection terminal 305 may have the ability to read, for example, a 10-digit bar code, convert or translate the data, and direct print 310 to print the new label comprising the converted data.

If it is determined at decision block 735 that label data needs to be converted, exemplary method 700 advances to stage 740 where a 10-digit print stream data read from the label is translated into 24-digit label print stream data. For example, once the 10-digit data is read, a programming module on label collection terminal 305 may convert the 10-digit data into 24-digit data in preparation of printing a new label. Although 10 and 24-digit bar codes may be utilized in embodiments of the present invention, those of ordinary skill in the art will appreciate that coding types other than bar coding may be employed and bar codes other than 10-or 24-digit codes may be used.

If it is determined at decision block 735 that label data does not need to be converted, or from stage 740 where a 10-digit print stream data read from the label is translated into 24-digit label print stream data, exemplary method 700 ends at stage 745.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for collecting a label in an item delivery system, comprising:

reading a label on a unit load when the unit load is terminated;

defacing the label if the quality of the label meets a predefined quality level;

depositing the label in a read bin holder if the quality of the label meets a predefined quality level; and depositing the label in a no-read bin holder if the quality of the label does not meet a predefined quality level.

2. The method of claim 1, further comprising validating whether the unit load is being routed properly using data read from the label.

3. The method of claim 2, further comprising providing an indication if the unit load is not being routed properly.

4. The method of claim 3, wherein the indication comprises at least one of a visual indicator and a audible indicator.

5. The method of claim 1, wherein the unit load is terminated when it is at least one of emptied for further processing and emptied for delivery.

6. The method of claim 1, further comprising reading a label which Includes a tracking indica containing a serial number unique to the unit load.

7. The method of claim 1, further comprising reading a label including at least one of a bar code, a PLANET code, and an improved tracking label.

8. The method of claim 1, further comprising reading a label on a unit load one of a mail tray, a mail sack, and a mail tub.

9. The method of claim 1, further comprising translating a 10-digit print stream data read from the label into 24-digit label print stream data.

10. A system for collecting a label in an item delivery system, comprising:

a component for reading a label on a unit load when the unit load is terminated;

a component for defacing the label if the quality of the label meets a predefined quality level;

a component for depositing the label in a read bin holder if the quality of the label meets a predefined quality level; and a component for depositing the label In a no-read bin holder if the quality of the label does not meet a predefined quality level.

11. The system of claim 10, further comprising a component for validating whether the unit load is being routed properly using data read from the label.

12. The system of claim 11, further comprising a component for providing an indication if the unit load is not being routed properly.

13. The system of claim 12, wherein the indication comprises at least one of a visual indicator, and a audible indicator.

14. The system of claim 10, wherein the unit load is terminated when it is at least one of emptied for further processing, and emptied for delivery.

15. The system of claim 10, wherein the label includes a tracking indica containing a serial number unique to the unit load.

16. The system of claim 10, wherein the label includes at least one of a bar code, a PLANET code, and an improved tracking label.

17. The system of claim 10, wherein the unit load comprises at least one of a mail tray, a mail sack, and a mail tub.

18. The system of claim 10, further comprising a component translating a ten-digit print stream data read from the label into a 24-digit label print stream data.

* * * * *

UNITED STATES PATENT AND TRADEMARK OFFICE

CERTIFICATE OF CORRECTION

PATENT NO. : 7,143,937 B2 
APPLICATION NO. : 10/468482
DATED : December 5, 2006
INVENTOR(S) : Brent A. Raney et al.

It is certified that error appears in the above-identified patent and that said Letters Patent is hereby corrected as shown below:

On the title page, item (12), line 2, “Rainey” should read --Raney--.

On the title page, item (75), line 1, “Rainey,” should read --Raney,--.

On the title page, item (57), line 9, “communication” should read --communications--.

Column 10, line 38, “Includes” should read --includes--.

Column 10, line 38, “indica” should read --indicia--.

Column 10, line 59, “In” should read --in--.

Column 11, line 2, “a audible” should read --an audible--.

Column 11, line 8, “indica” should read --indicia--.

Signed and Sealed this

Sixth Day of March, 2007

JON W. DUDAS
*Director of the United States Patent and Trademark Office*